United States Patent [19]
Wilson et al.

[11] Patent Number: 5,494,429
[45] Date of Patent: Feb. 27, 1996

[54] APPARATUS FOR EXTRUDING THERMOPLASTIC MATERIALS

[75] Inventors: Gregory M. Wilson, Eau Claire; Donald R. Garton, Jr., Chippewa Falls, both of Wis.

[73] Assignee: Extrusion Dies, Inc., Chippewa Falls, Wis.

[21] Appl. No.: 335,188

[22] Filed: Nov. 7, 1994

Related U.S. Application Data

[63] Continuation of Ser. No. 118,113, Sep. 7, 1993, abandoned.

[51] Int. Cl.$^6$ .................................................. B29C 47/14
[52] U.S. Cl. .................................. 425/192 R; 425/133.5; 425/461
[58] Field of Search ........................... 425/192 R, 190, 425/133.5, 461, 466, 462

[56] References Cited

U.S. PATENT DOCUMENTS

| | | | |
|---|---|---|---|
| 3,057,010 | 10/1962 | Reifenhäuser | 425/461 |
| 3,360,823 | 1/1968 | Tyrner | 425/461 |
| 3,680,997 | 8/1972 | Dukert et al. | 425/192 |
| 3,825,645 | 7/1974 | Fayet | 264/177 |
| 3,860,383 | 1/1975 | Sirevicius | 425/461 |
| 3,884,611 | 5/1975 | Anderson et al. | 425/376 |
| 4,043,739 | 8/1977 | Appel | 425/461 |
| 4,152,387 | 5/1979 | Cloeren | 264/171 |
| 4,197,069 | 4/1980 | Cloeren | 425/131.1 |
| 4,217,322 | 8/1980 | Sugano et al. | 264/176 R |
| 4,285,655 | 8/1981 | Matsubara | 425/461 |
| 4,316,868 | 2/1982 | Esposito et al. | 264/171 |
| 4,533,308 | 8/1985 | Cloeren | 425/131.1 |
| 4,600,550 | 7/1986 | Clören | 264/171 |
| 4,619,802 | 10/1986 | Cloeren | 264/171 |
| 4,669,965 | 6/1987 | Murakami | 425/133.5 |
| 4,780,258 | 10/1988 | Cloeren | 264/171 |
| 4,784,815 | 11/1988 | Cloeren et al. | 264/171 |
| 4,789,513 | 12/1988 | Cloeren | 264/171 |
| 4,839,131 | 6/1989 | Cloeren | 264/171 |
| 5,020,984 | 6/1991 | Cloeren et al. | 425/141 |
| 5,066,443 | 11/1991 | Cloeren | 264/171 |
| 5,120,484 | 6/1992 | Cloeren | 264/171 |
| 5,141,691 | 8/1992 | Pace | 264/171 |
| 5,147,195 | 9/1992 | Cloeren | 425/133.3 |
| 5,208,047 | 5/1993 | Cloeren et al. | 425/141 |
| 5,223,276 | 6/1993 | Djordjevic et al. | 425/131.1 |
| 5,234,330 | 8/1993 | Billow et al. | 425/192 R |
| 5,256,052 | 10/1993 | Cloeren | 425/133.5 |

FOREIGN PATENT DOCUMENTS 1179730  4/1966  United Kingdom.

OTHER PUBLICATIONS

Drawing of Multiflow III.
Japanese Patent Abstract, Publication Date: Oct. 24, 1981, Publication No.: JP56136328.
SPE Journal, Jan. 1970–vol. 26, No. 1, pp. 25–28, "Recent Developments in Sheet Extrusion Systems".
IBM Technical Disclosure Bulletin, vol. 24, No. 7A, pp. 3284–3285 Dec. 1981, "Adjustable–Gap Extrusion Die".
European Search Report dated Dec. 15, 1994, Application No. EP 94 11 3929.
C1–C8 are copies of photographs depicting prior–art dies.
Copy of blueprint.
Copy of blueprint.

*Primary Examiner*—Khanh P. Nguyen
*Attorney, Agent, or Firm*—Marshall, O'Toole, Gerstein, Murray & Borun

[57] ABSTRACT

An extrusion apparatus for extruding thermoplastic material includes first and second die body portions that define a manifold which has a back line and is in fluid communication with an outlet through which the thermoplastic material is extruded and wherein the back line is substantially parallel to the outlet. First and second body bolts join the first and second die body portions together. The first and second body bolts are disposed at first and second equal distances, respectively, from the back line and are further disposed on opposite sides of a centerline of the extrusion apparatus at third and fourth unequal distances therefrom, respectively, and are substantially equally spaced from the outlet.

18 Claims, 3 Drawing Sheets

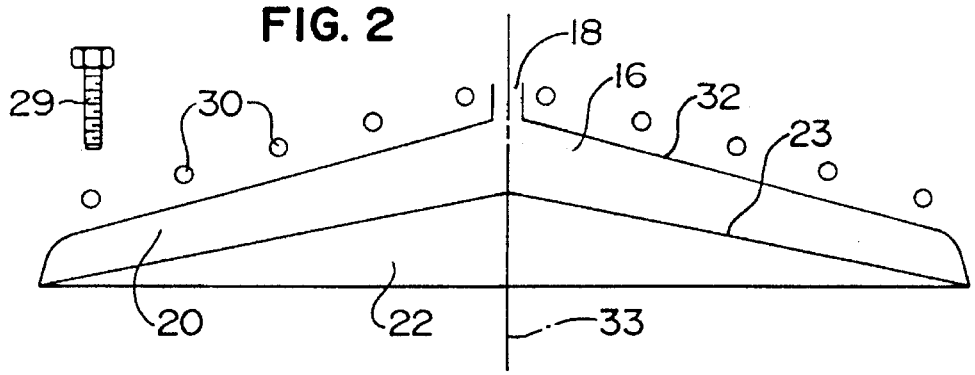
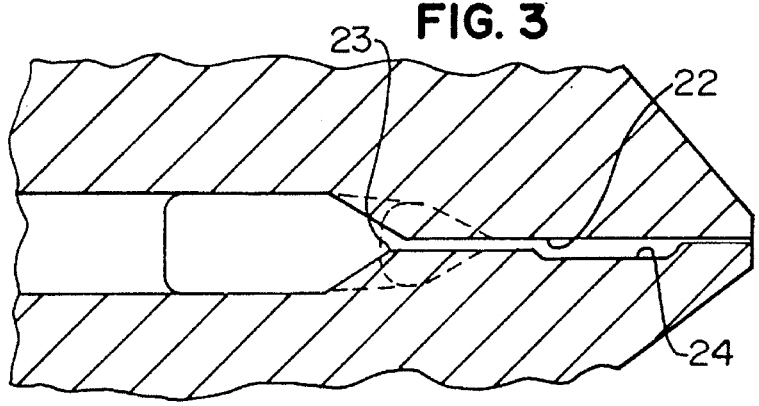
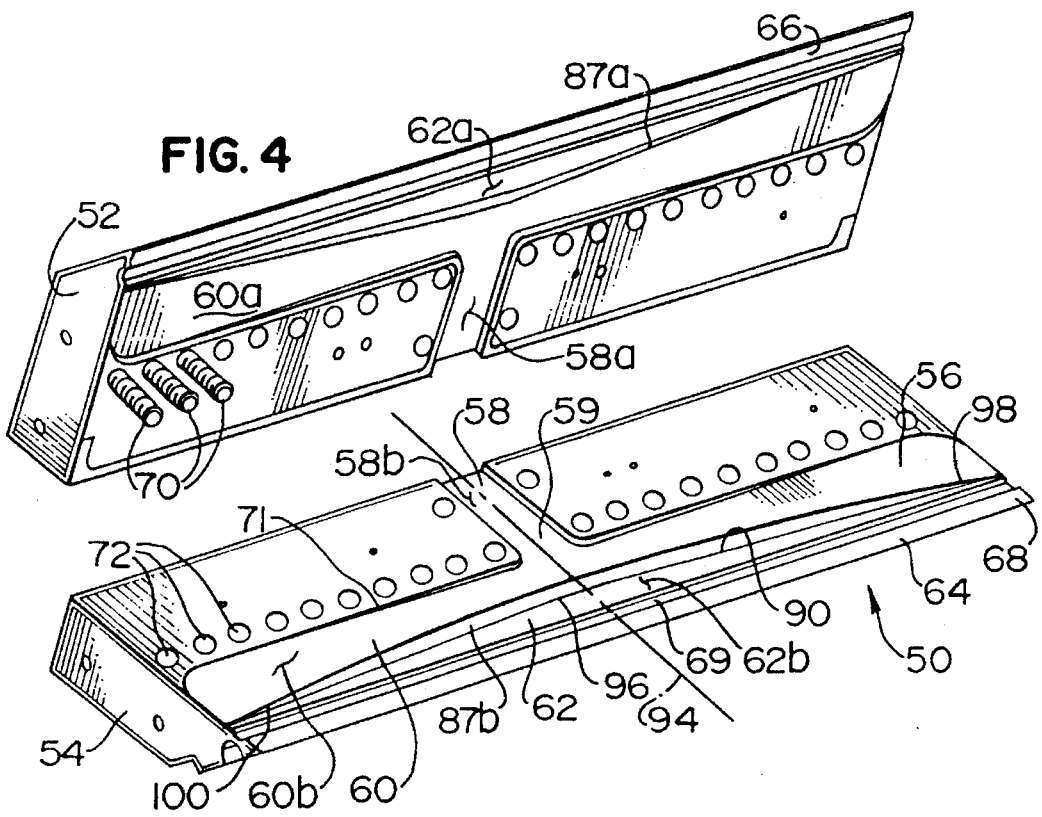

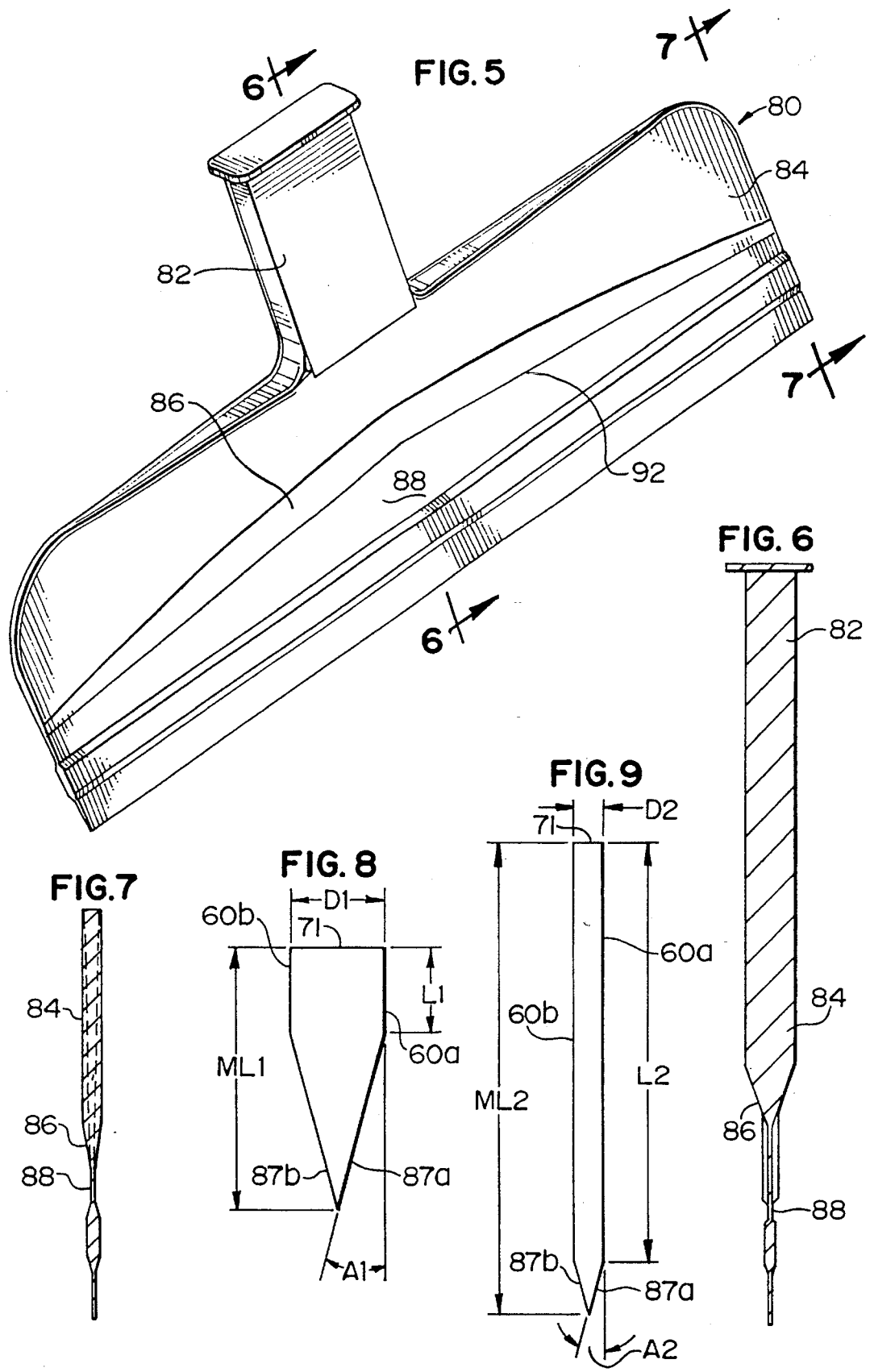

APPARATUS FOR EXTRUDING THERMOPLASTIC MATERIALS

This is a continuation of U.S. Ser. No. 08/118,113, filed Sep. 7, 1993, now abandoned.

TECHNICAL FIELD

The present invention relates generally to extrusion apparatus and more particularly to an extrusion die for coextruding thermoplastic materials to produce a sheet of substantially uniform thickness.

BACKGROUND ART

An extrusion die is used to extrude molten thermoplastic into a film or sheet. A prior type of extrusion die includes a die cavity having a coathanger-shaped manifold at an upstream portion of the die, a triangular preland portion downstream of the manifold, a melt well (otherwise referred to as a secondary relief or secondary manifold) downstream of the preland portion and a die exit adjacent the melt well. In this type of die, a back line (or upstream edge) of the preland portion includes linear edges forming a taper which converges toward a die entrance. The preland portion provides resistance to flow which varies over the width of the die so that the flow of thermoplastic is uniformly transversely spread out.

It has been found that, owing to the rheological characteristics of thermoplastics, the use of a preland portion having a linearly tapered upstream or downstream edge results in less than ideal thermoplastic flow through the die. In particular, in the case where a monolayer flow is passed through the die, the extrudate tends to flow in a fashion which produces an M-shaped or W-shaped flow distribution profile. In the past, this problem was obviated for a given extruder flow rate by adjusting the lip gap at the die exit so that the flow nonuniformity was corrected. Because extruder flow rates in the past were typically maintained substantially constant from job to job, this adjustment did not have to be frequently repeated in order to maintain high quality output. However, more recent attempts at reducing costs by reducing inventories have led to the need to produce short runs of product, thereby necessitating the use of differing extruder flow rates. This undesirably creates the need to frequently readjust the lip gap at the die exit.

In the case where two or more thermoplastic flows are to be coextruded in separate layers, the use of a conventional die as described above results in the production of a layer boundary (or layer boundaries) having an M or W shape. Such an interface deformation (or encapsulation) results not only from the linear preland configuration but also from the manifold design. This deformation cannot be eliminated by adjusting the die lip gap. In addition to the foregoing effect, the overall film will have the M or W shape noted above in connection with monolayer applications.

Appel U.S. Pat. No. 4,043,739 discloses an extrusion die of the coathanger type wherein a back line of a preland portion is nonlinearly tapered, i.e., the edges defining the taper are curved. Also, in this die the depth of a manifold portion upstream from the preland portion (i.e., the distance between assembled die halves in the manifold portion) decreases in a nonlinear fashion from a centerline of the die to outside ends thereof. A similar die is sold by assignee of the instant application and is referred to as the "Multiflow III" die. In at least the case of this latter die, the production of M or W shapes in the cross-section of the produced monolayer or multilayer sheet is substantially reduced or eliminated.

Prior art coathanger-type extrusion dies, such as those described above, have encountered a problem known as differential clam-shelling which causes an extruded sheet of thermoplastic material to be thicker at the center than at the ends, which is undesirable. This effect is caused by the pressure of the molten thermoplastic material acting against moment arms of differing lengths resulting from the anchoring of die halves at points unequally spaced from the die exit.

In an extrusion apparatus referred to as the "Epoch" die manufactured and sold by the Cloeren Company of Orange, Tex., an inverted preland portion separates a manifold from a melt well and a die exit. The inverted preland portion includes an upstream edge or back line which extends as a straight line from one end of the die to the other perpendicular to the centerline of the die and further includes a downstream edge which is nonlinearly tapered toward the die exit. A claim is made by the manufacturer of this die that, because of the straight leading edge, the back line of the manifold may similarly be configured to extend straight across the die width perpendicular to the centerline of the die, thereby resulting in the ability to locate body bolts holding the die halves together at points equally spaced from the die exit. However, it is believed that the Epoch die does not truly have a straight or nontapered manifold back line owing to the need to have the manifold diminish in length toward the die ends, and hence there is no way to locate the body bolts at equally spaced points from the die exit without causing some bolts to be spaced farther from the manifold back line than others, thus substantially increasing the risk of developing a leak between the die halves at the manifold back line.

Further, because the downstream edge of the preland portion of the Epoch die is tapered, the melt well flow path increases in length from the center of the die to the outside portions of the die, thereby introducing undesirable disturbances in the thermoplastic melt flow.

SUMMARY OF THE INVENTION

In accordance with the present invention, an extrusion apparatus for extruding thermoplastic materials includes first and second die body portions that define a manifold having a back line and being in fluid communication with an outlet through which the thermoplastic materials are extruded wherein the back line is substantially parallel to the outlet. The apparatus also includes first and second body bolts joining the first and second die body portions together. The first and second body bolts are disposed at first and second equal distances, respectively, from the back line and are further disposed on opposite sides of a centerline at third and fourth unequal distances therefrom, respectively, and are substantially equally spaced from the outlet.

Preferably, a preland portion is disposed adjacent the manifold wherein the preland portion includes a nonlinear tapered edge. Also preferably, in accordance with a specific aspect of the present invention, the edge of the preland portion is characterized by a quadratic function. According to an alternative aspect, the edge of the preland portion includes a central portion and end portions wherein the end portions are closer to the outlet than the central portion.

Still further in accordance with the preferred embodiment, the manifold has a depth extending between the die body portions which diminishes in a nonlinear fashion from the centerline to an outer portion.

Also, the apparatus preferably includes third and fourth body bolts adjacent the back line of the manifold and joining the first and second die body portions together wherein the first, second, third, and fourth body bolts are substantially equally spaced from the outlet.

The apparatus may also include a plurality of additional body bolts adjacent the back line of the manifold and joining the first and second die body portions together wherein all of the body bolts are substantially equally spaced from the outlet.

Preferably, the manifold has an outlet end and a length extending from the inlet end to the outlet end wherein the length nonlinearly increases from the centerline of the apparatus to an outer end of the apparatus.

The apparatus preferably may be adapted for coextrusion of a pair of layers of thermoplastic material through the first and second die body portions wherein the coextruded layers may be composed of materials having similar or dissimilar rheological properties.

According to another aspect of the present invention, an extrusion apparatus for extruding thermoplastic material includes first and second die body portions defining a manifold having a manifold back line, a preland portion bordering the manifold at a nonlinear preland back line and a die outlet. The manifold has a length extending from the manifold back line to the preland back line which increases from a centerline of the apparatus to an outer end of the apparatus. The manifold back line and the die outlet extend along substantially straight parallel first and second lines, respectively, which are perpendicular to the die centerline. A plurality of body bolts are all spaced from the first line by a first distance and are all spaced from the second line by a second distance.

The extrusion apparatus of the present invention minimizes the clam-shelling effect and is capable of producing thermoplastic film having reduced or eliminated flow non-uniformities resulting in an M or W shape.

BRIEF DESCRIPTION OF THE DRAWINGS

FIG. 2 comprises a diagrammatic plan view of one of the die halves of the prior art apparatus of FIG. 1;

FIG. 3 comprises a fragmentary sectional view of the apparatus taken along the lines 3—3 of FIG. 1;

FIG. 4 comprises a perspective of an extrusion die apparatus in accordance with the present invention;

FIG. 5 comprises a isometric view of a slug formed in the cavity of the apparatus of FIG. 4;

FIG. 6 comprises a sectional view of the slug taken along the lines 6—6 of FIG. 5;

FIG. 7 comprises a sectional view of the slug taken along the lines 7—7 of FIG. 5; and FIGS. 8 and 9 comprise diagrammatic sectional views taken generally along the lines 6—6 and 7—7, respectively, of FIG. 5 showing the change in manifold shape of the apparatus of FIG. 4.

DESCRIPTION OF THE PREFERRED EMBODIMENTS

Figure 1:
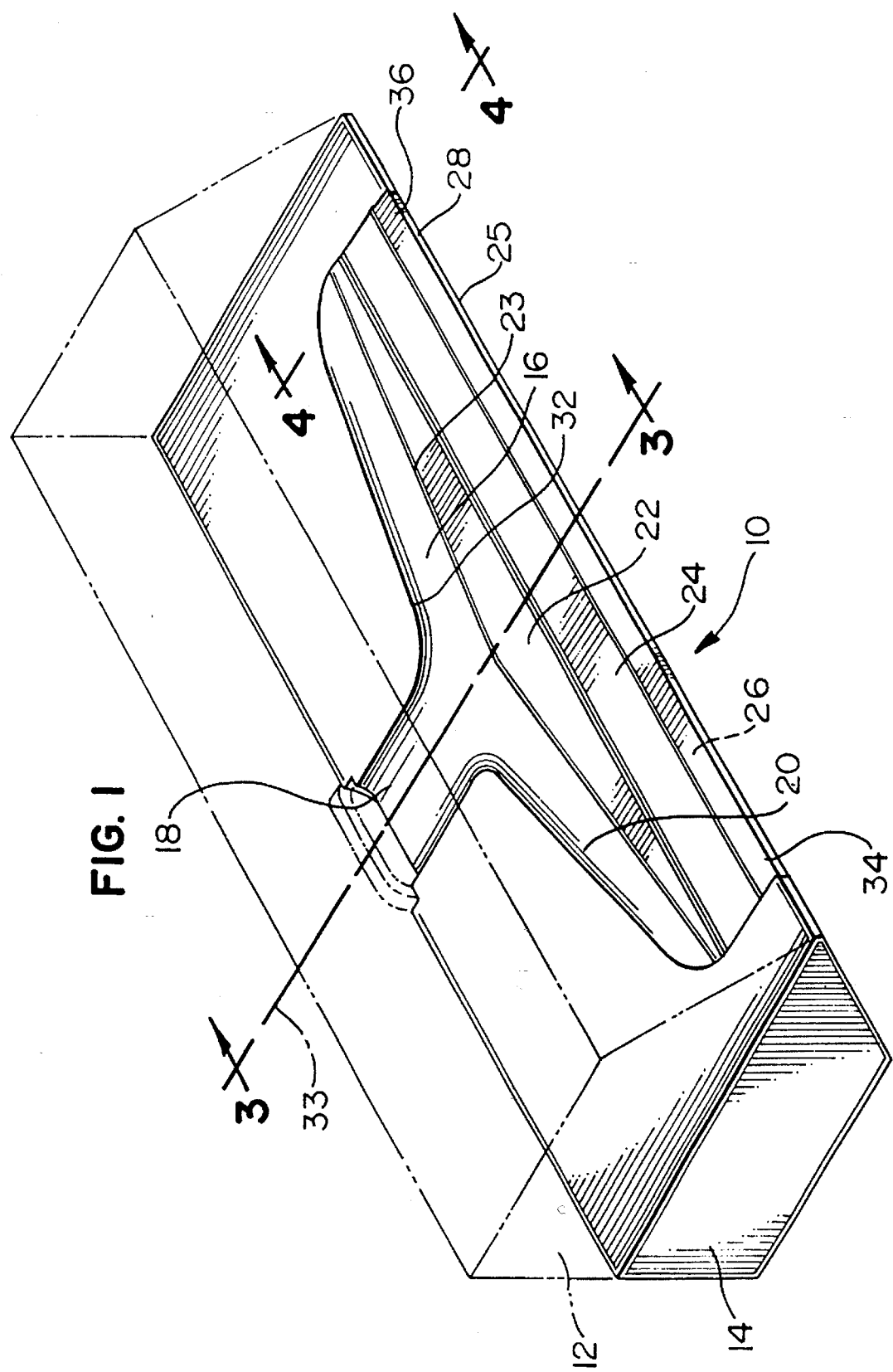
FIG. 1 comprises a perspective, partially in phantom, of a prior art extrusion die apparatus.

As seen in FIG. 1, a prior art extrusion die 10 includes upper and lower die body portions or halves 12 and 14, which are assembled together to form a cavity 16 including an inlet 18, a manifold 20, and a preland portion 22 having a preland back line 23. The cavity 16 further includes a melt well 24 disposed between the preland portion 22 and a gap or die exit 25 disposed between a lip 26 of the upper die body portion 12 and a lip 28 of the lower die body portion 14.

The prior art extrusion die 10 is operable to extrude monolayer or multilayer molten thermoplastic through the die exit 25 to form film or sheet product. However, the prior art extrusion die 10 suffers from a problem known in the art as differential clam-shelling. Differential clam-shelling is a phenomenon caused by the high pressure required to pass highly viscous molten thermoplastic through the extrusion die 10. This pressure tends to separate the die halves 12 and 14 in opposition to the restraining forces applied by a plurality of body bolts 29 (shown diagrammatically in FIG. 2) which are threaded into holes 30 and join the die halves 12 and 14 together. The body bolts 29 are disposed on both sides of the inlet 18 adjacent a manifold back line 32.

As best seen in FIGS. 2 and 3, the manifold 20 of the prior art extrusion die 10 has a conventional coathanger shape wherein the cavity 16 has a length extending from the back line 32 to the die exit 25. This length is greatest along a centerline 33 of the die 10 and decreases substantially linearly toward either end 34 or 36 of the die 10 over a majority of the width of the die 10.

As noted above, the body bolts 29 are disposed adjacent the back line 32 of the manifold 20, and hence the distance between a body bolt 29 and the die exit 25 is greatest at the centerline 33 and decreases toward either end 34 or 36 of the die 10. As a result, the moment arm for deflection of the upper and lower die body portions 12 and 14 varies along the width of the extrusion die 10. The separating pressure exerted by the thermoplastic flow is thus able to cause greater deflection of the upper and lower die body portions 12 and 14 near the centerline of the die 10 than near the ends 34 and 36 thereof.

While it is possible to locate the body bolts 29 in holes 30 spaced equidistantly from the die exit 25, such a placement increases the risk of a leak developing between the die halves at the outer lids of the die owing to the large distance between the bolts and the manifold back line 32 at such points.

In addition to the foregoing, the preland back line 23 is linear in configuration. This configuration is believed to contribute to nonuniformities in the thermoplastic flow, resulting in the M-shaped flow distribution profiles noted above.

Referring now to FIG. 4, an extrusion die 50 in accordance with the present invention includes upper and lower die body portions or halves 52 and 54, which are assembled together and define a cavity 56 including an inlet 58 communicating with an inlet end 59 of a manifold 60 and a preland portion 62. The cavity 56 of the extrusion die 50 is in fluid communication with a gap or die exit 64 extending along the width of the extrusion die 50 between a lip 66 of the upper die body portion 52 and a lip 68 of the lower die body portion 54. A melt well 69 is disposed between the preland portion 62 and the die exit 64.

The upper and lower die body portions 52 and 54 of the extrusion die 50 are joined together by a plurality of body bolts 70 received in a corresponding number of holes 72 in the upper and lower die body portions 52 and 54 adjacent a back line 71 of the manifold at the inlet end 59.

In the preferred embodiment of the extrusion die 50 of the present invention, the cavity 56 has a length from the manifold back line 71 to the die exit 64 that is substantially constant along substantially the entire width of the extrusion die 50. Also in the preferred embodiment, the body bolts 70 are disposed at equal distances from the back line 71 of the manifold 60, and hence, all of the body bolts 70 are equally spaced from the die exit 64. All of the body bolts 70, therefore, act against moment arms of equal lengths in opposition to the forces exerted by the high pressure molten thermoplastic flow. As a result, the extrusion die 50 minimizes the chance of leaks at the manifold back line 71 and overcomes the differential clam-shelling problem suffered by the extrusion die 10 of the prior art and produces an extruded planar sheet of substantially uniform thickness.

FIGS. 5–7 illustrate a solidified thermoplastic slug 80 representing the shape of the cavity 56 of the die 50. The manifold 60 of the die 50 has a depth (i.e., left-to-right dimension in FIGS. 6 and 7) which is greatest at the centerline 94 of the die 50 where the slug 80 is thickest. As best seen in FIGS. 5 and 7, the thickness of the slug 80, and hence the depth of the manifold 60, tapers nonlinearly to a lesser thickness or depth toward either end of the die 50.

The slug 80 includes a neck 82 created by walls 58a, 58b defining the inlet 58, a body 84 defined by walls 60a, 60b and a tapered portion 86 created by walls 87a, 87b, respectively, defining the manifold 60, and a planar portion 88 created by walls 62a, 62b defining the preland portion 62 of the die 50. The manifold 60, and hence the body 84 and the tapered portion 86 formed thereby, has a length extending from the inlet 58 to a preland back line 90, represented by a line 92 in the slug 80. The preland back line 90 includes a central portion 96 and end portions 98, 100 which are closer to the die exit 64 than is the central portion 96.

Referring now to FIGS. 8 and 9, the shape of the manifold 60 is diagrammatically shown to be an extended tear-drop configuration formed by the walls 60a, 60b, 87a, 87b and the back line 71. The length of the manifold 60 (i.e., the top-to-bottom dimension in FIGS. 8 and 9) increases nonlinearly from a length ML1 at the centerline of the die 94 to a length ML2 at either end of the die 50, independently of the depth of the manifold 60. The length of the preland portion 62 correspondingly decreases to accommodate the previously described uniform distance from the back line 71 to the die exit 64.

In addition to this change in manifold length, the depth of the manifold 60 decreases from a depth D1 at the centerline 94 to a depth D2 at either end of the die. This results in an increase in aspect ratio from L1/D1 at the centerline 94 to L2/D2 at either end of the die, where L1 and L2 are the lengths of the extended portion of the tear-drop configuration at the centerline 94 and an end of the die, respectively. This change in aspect ratio contributes to a reduction in the formation of M or W shapes in the interface(s) between layers of coextruded product, regardless of whether the layers are formed of materials having similar or dissimilar rheological characteristics.

It should be noted that, in some applications, it may be desirable to maintain the aspect ratio of the manifold below a certain maximum value to prevent the formation of areas of stagnation in the die cavity.

Because the length of the manifold 60 changes nonlinearly, the back line 90 of the preland portion 62 is also nonlinear and is preferably characterized by a quadratic or parabolic function, as best seen in FIG. 4. Such a shape contributes to a reduction in the formation of an M or W shape both in the overall monolayer or multilayer product and in the boundary or boundaries between layers of a coextruded product by the die.

The shape of the preland back line 90 can be determined empirically or numerically, such as through use of the formula disclosed in Matsubara, U.S. Pat. No. 4,285,655, the disclosure of which is hereby incorporated by reference herein or by finite element numerical analysis. Inasmuch as the particular way in which this shape is determined forms no part of the present invention, it will not be described in greater detail herein.

As seen in FIGS. 8 and 9 the angles between the walls 60a, 60b and the walls 87a, 87b, respectively, are equal to an angle A1 at the centerline 94 and an angle A2 at the die ends. The angle A1 may be greater than, equal to, or less than the angle A2, as desired.

Numerous modifications and alternative embodiments of the invention will be apparent to those skilled in the art in view of the foregoing description. Accordingly, this description is for the purpose of teaching those skilled in the art the best mode of carrying out the invention and is to be construed as illustrative only. The details of the structure may be varied substantially without departing from the spirit of the invention, and the exclusive use of all modifications which come within the scope of the appended claims is reserved.

We claim:

1. An extrusion die, comprising, in combination:

mating die portions having walls defining a die inlet, a substantially straight-line die exit and a die cavity, wherein the die cavity includes a manifold in fluid communication with the die inlet and having a substantially linear manifold back line substantially parallel to the die exit and disposed at a first manifold end and further having a length L extending from the first manifold end toward the die exit to a second manifold end, a width extending from a first side of the die through a center of the die to a second side of the die and a depth D extending between the mating die portions and wherein the length L and the depth D vary over the width of the manifold, the manifold further having a cross-sectional configuration at a point between the first and second sides of the die including a first manifold section contiguous to the manifold back line and defined by substantially parallel walls of the mating die portions, a second manifold section disposed between the first manifold section and the preland back line and defined by tapered walls of the mating die portions and a cross-sectional aspect ratio equal to L/D of a first magnitude at the center of the die and a second magnitude greater than the first magnitude at one of the first and second sides of the die, the die cavity further including a preland portion having a first preland portion end defined by a nonlinear preland back line contiguous to the second manifold end over the entire width of the manifold and further having a second preland portion end in fluid communication with the die exit; and body bolts extending through and joining the mating die portions, the body bolts lying on a particular line substantially parallel to the manifold back line.

2. The extrusion die of claim 1, wherein the preland portion has a length which varies quadratically with distance from the center of the die.

3. The extrusion die of claim 1, wherein the depth D of the manifold nonlinearly decreases from the center of the die to at least one of the first and second sides of the die.

4. The extrusion die of claim 1, wherein the length L of the manifold nonlinearly increases from the center of the die to at least one of the first and second sides of the die.

5. The extrusion die of claim 1, wherein the length L of the manifold nonlinearly increases and the depth D of the manifold nonlinearly decreases from the center of the die to at least one of the first and second sides of the die.

6. The extrusion die of claim 1, wherein the preland back line is closer to the die exit at the sides of the die than at the center of the die.

7. The extrusion die of claim 6, further including a melt well disposed between the preland portion and the die exit and extending from a melt well back line to a melt well front line wherein the melt well back line and the melt well front line are straight and parallel to one another and parallel to the die exit.

8. An extrusion die, comprising, in combination:
mating die portions having walls defining a die inlet, a substantially straight-line die exit and a die cavity, wherein the die cavity includes
a manifold in fluid communication with the die inlet and having a substantially linear manifold back line substantially parallel to the die exit and disposed at a first manifold end and further having a length L extending from the first manifold end toward the die exit to a second manifold end, a width extending from a first side of the die through a center of the die to a second side of the die and a depth D extending between the mating die portions and wherein the length L nonlinearly increases and the depth D nonlinearly decreases from the center of the die to each of the first and second sides of the die, the manifold further having an extended tear-drop cross-sectional configuration at a point between the first and second sides of the die including
a first manifold section contiguous to the manifold back line and defined by substantially parallel walls of the mating die portions and
a second manifold section disposed between the first manifold section and the preland back line and defined by tapered walls of the mating die portions,
the die cavity further including a preland portion extending from a first preland portion end to a second preland portion end, the first preland portion end being defined by a nonlinear preland back line contiguous to the second manifold end over the entire width of the manifold and the second preland portion end being in fluid communication with the die exit; and
body bolts extending through and joining the mating die portions, the body bolts lying on a particular line substantially parallel to the manifold back line.

9. The extrusion die of claim 8, wherein the cross-sectional configuration of the manifold includes a cross-sectional aspect ratio equal to L/D of a first magnitude at the center of the die and a second magnitude greater than the first magnitude at each of the first and second sides of the die.

10. The extrusion die of claim 9, wherein the preland portion has a length extending from the first preland portion end to the second preland portion end wherein the preland portion length varies quadratically with distance from the center of the die.

11. The extrusion die of claim 10, further including a melt well disposed between the preland portion and the die outlet and extending from a melt well backline to a melt well front line wherein the melt well back line and the melt well front line are straight and parallel to one another and parallel to the die outlet.

12. An extrusion die, comprising, in combination:
mating die portions having walls defining a die inlet, a substantially straight-line die exit and a die cavity, wherein the die cavity includes
a manifold in fluid communication with the die inlet and having a substantially linear manifold back line substantially parallel to the die exit and disposed at a first manifold end and further having a length L extending from the first manifold end toward the die exit to a second manifold end, a width extending from a first side of the die through a center of the die to a second side of the die and a depth D extending between the mating die portions and wherein the length L and the depth D vary over the width of the manifold, the manifold further having a cross-sectional configuration at a point between the first and second sides of the die including
a first manifold section contiguous to the manifold back line and defined by substantially parallel walls of the mating die portions,
a second manifold section disposed between the first manifold section and the preland back line and defined by tapered walls of the mating die portions and
a cross-sectional aspect ratio equal to L/D of a first magnitude at the center of the die and a second magnitude greater than the first magnitude at one of the first and second sides of the die,
the die cavity further including a preland portion having a first preland portion end defined by a preland back line contiguous to the second manifold end over the entire width of the manifold and further having a second preland portion end in fluid communication with the die exit; and
body bolts extending through and joining the mating die portions, the body bolts lying on a particular line substantially parallel to the manifold back line.

13. The extrusion die of claim 12, wherein the preland back line is nonlinear.

14. The extrusion die of claim 13, wherein the preland portion has a length extending from the first preland portion end to the second preland portion end which varies quadratically with distance from the center of the die.

15. The extrusion die of claim 12, wherein the depth D of the manifold nonlinearly decreases from the center of the die to at least one of the first and second sides of the die.

16. The extrusion die of claim 12, wherein the length L of the manifold nonlinearly increases and the depth D of the manifold nonlinearly decreases from the center of the die to at least one of the first and second sides of the die.

17. The extrusion die of claim 12, wherein the preland back line is closer to the die exit at the sides of the die than at the center of the die.

18. The extrusion die of claim 12, further including a melt well disposed between the preland portion and the die exit and extending from a melt well back line to a melt well front line wherein the melt well back line and the melt well front line are straight and parallel to one another and parallel to the die exit.

* * * * *